(12) United States Patent
Wang et al.

(10) Patent No.: US 7,669,049 B2
(45) Date of Patent: *Feb. 23, 2010

(54) SYSTEM AND METHOD FOR PROTECTING PRIVACY AND ANONYMITY OF PARTIES OF NETWORK COMMUNICATIONS

(75) Inventors: Yi-Min Wang, Bellevue, WA (US);
Qixiang Sun, Amarillo, TX (US);
Daniel R. Simon, Redmond, WA (US);
Wilfred Russell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

This patent is subject to a terminal disclaimer.

(21) Appl. No.: 11/072,143

(22) Filed: Mar. 4, 2005

(65) Prior Publication Data

US 2005/0172120 A1    Aug. 4, 2005

Related U.S. Application Data

(63) Continuation of application No. 10/102,036, filed on Mar. 20, 2002, now Pat. No. 6,986,036.

(51) Int. Cl.
*G06F 9/00* (2006.01)
(52) U.S. Cl. .................... 713/161; 713/164; 713/168
(58) Field of Classification Search ............... 713/161, 713/164, 168
See application file for complete search history.

(56) References Cited

OTHER PUBLICATIONS

Chaum, David L., "Untraceable Electronic Mail, Return Addresses, and Digital Pseudonyms", *CACM*, Feb. 1981, vol. 24, No. 2, pp. 84-88.

Felton, Edward W. et al., "Timing Attacks on Web Privacy'" *Proceedings of the 7th ACM Conference on Computer and Communications Security*, Nov. 2000, pp. 25-32.

Goldschlag, David M. et al. "Onion Routing for Anonymous and Private Internet Connections", *Communications of the ACM*, Feb. 1999, vol. 42, No. 2, pp. 39-41.

Haveliwala, Taher, "Scalable Techniques for Clustering the Web", 2000, http://dbpubs.stanford.edu/pub/2000-23 last printed Feb. 11, 2004.

Padmanabhan, V. N. et al. "An Investigation of Geographic Mapping Techniques for Internet Hosts", *Proceedings of acm sigcomm*, Oct. 2001, vol. 31, No. 4, pp. 173-185.

Raymond, Jean-Francois, "Traffic Analysis: Protocols, Attacks, Design Issues, and Open Problems", *Designing Privacy Enhancing Technologies: Proceedings/InternationalWorkshop on Design Issues in Anonymity and Unobservability*, Berkeley CA, Jul. 25-26, 2000, vol. 2009, pp. 10-29.

(Continued)

*Primary Examiner*—Thomas Peeso
(74) *Attorney, Agent, or Firm*—Lee & Hayes, PLLC (57) ABSTRACT

A system and method is provided for handling network communications between a client and a target server on the Internet to protect the privacy and anonymity of the client.

For a session between the client and the target server, a routing control server sets up a routing chain using a plurality of Web servers randomly selected from a pool of participating Web servers as routers for routing messages between the client and the target server. To prevent traffic analysis, an "onion encryption" scheme is applied to the messages as they are forwarded along the routing chain.

A payment service cooperating with the routing control server allows a user to pay for the privacy protection service without revealing her real identity.

10 Claims, 3 Drawing Sheets

OTHER PUBLICATIONS

Reiter, Michael K. et al., "Crowds: Anonymity for Web Transactions", *ACM Transactions on Information and Systems Security*, Nov. 1998, vol. 1, No. 1, pp. 66-92.

Shields, Clay et al. "A Protocol for Anonymous Communication Over The Internet", *Proceeding of the 7th ACM Conference on Computer and Communications Security*, Nov. 2000, pp. 33-42.

Paulson, Tom, "It was a fishy way for a scientist to start wiring houses onto Web", *Seattle Post-Intelligencer new article*, Sep. 18, 2000, http://seattlep-i.nwsource.com/business/wang18.shtml.

Syverson, Paul F. et al., "Towards and Analysis of Onion Routing Security", *Designing Privacy Enhancing Technologies; Proceedings/International Workshop on Design Issues in Anonymity and Unobersrvability*, Berkeley, CA, Jul. 2000.

"Web Ad Blocking Under Linux/Unix, BeOS, MacOS and Windows" Last Update Feb. 20, 2000. http://ecst.csuchico.edu/~atman/spam/adblcok.shtml.

"Government Is Wary of tackling Online Privacy" *New York Times Business Day*, Sep. 6, 2001.

"As Big PC Brother Watches, Users Encounter Frustration", *New York Times*, Sep. 5, 2001.

"Giving the Web a Memory Cost Its Users Privacy" *New York Times*, Apr. 9, 2001.

Wang, Yi Min, et al., "A Toolkit for Building Dependable and Extensible Home Networking Applications," in proceeding USENIX Windows Systems Symposium, Aug. 2000, pp. 101-112.

Fielding R. et al., Hypertext Transfer Protocol-HTTP/I.1, http://www.w3.org/Protocols/HTTP/I.1/rfc2616.pdf.

SYSTEM AND METHOD FOR PROTECTING PRIVACY AND ANONYMITY OF PARTIES OF NETWORK COMMUNICATIONS

RELATED APPLICATION

This application is a continuation of the coassigned U.S. patent application Ser. No. 10/102,036, filed on Mar. 20, 2002, now U.S. Pat. No. 6,986,036 and entitled "System and Method for Protecting Privacy and Anonymity of Parties of Network Communications." Priority is hereby claimed to this case under 35 U.S.C. §120.

TECHNICAL FIELD OF THE INVENTION

This invention relates generally to communications over a computer network, and more particularly to a scheme for protecting the privacy and anonymity of parties involved in network communications routed over a large computer network, such as the Internet.

BACKGROUND OF THE INVENTION

On the Internet, electronic messages passed between two communicating parties are typically routed by various intermediate nodes. Although the communicating parties usually identify themselves to one another, they often do not desire to reveal to others on the network the contents of their communications. To that end, measures employing encryption methods can be used to prevent eavesdropping. Moreover, in some cases, the fact that a certain client is communicating with a particular Web host alone can be considered sensitive information. In other words, the parties do not want others to know who is talking to whom. For instance, a user may want to access a Website that provides information of a sensitive nature but does not want other people to find out that she has visited that Website.

To protect the anonymity and privacy of the client in terms of the client-server association, mechanisms that defeat potential traffic analyses need to be deployed.

In the literature, there have been two approaches to providing private or anonymous communications over the Internet or a similar large network. The first approach is referred to as the "mix-style" anonymity. Under this approach, a chain of pre-selected intermediate nodes, called "mixes," are inserted between a client application (e.g., a Web browser) and a target server (e.g., a Web host) for masking the existence of the client-server communications. To protect the contents of the communications, messages sent out by the client or the server are encrypted with a key shared by the client and the server. In addition, to prevent the first and last mixes on the routing chain from comparing the encrypted messages going through them and finding out that they are on the same chain, a scheme called "onion encryption" is used to make the messages appear differently on each intermediate link of the chain. The onion encryption scheme involves multi-layered encryption and decryption operations. The client encrypts each message to be sent to the target server multiple times with different keys, one for each mix in the routing chain, in the order of the mixes in the chain. When the message is routed through the chain, each mix "peels off a layer of the onion" by decrypting the message with its key, and forwards the decrypted message to the next mix on the chain. Due to the use of the onion encryption scheme, the "mix-style" approach is often referred to as "onion routing."

Thus, the "mix-style" approach hides, or "masquerades," the client-server association by mixing the client-server messages with other traffic flows routed by the mixes, and constantly changing the appearance of the messages along the way, to make it difficult to trace the traffic from the client to the server and vice versa. For this scheme to be effective, a large number of client applications are required to send messages through the same set of mixes so that the mixes can batch, delay, reorder, and pad the messages to confuse anyone who tries to analyze the traffic to find out which outgoing message from a given mix corresponds to which message that came to the mix. In the case that there is not enough client traffic that can be manipulated to cause confusion, the mixes will generate fake traffic called "cover traffic" to enhance the masquerading effect.

Although the mix-style approach is quite effective, a main drawback of that approach is its inefficiency and high implementation cost. The expenses of generating cover traffic, the centralization and delay required to ensure the accumulation of sufficient genuine traffic to obscure sender/receiver correlations, and the need for costly synchronization of message processing for avoiding timing attacks make the deployment of mix-style networks somewhat impractical. Furthermore, any weakening of these expensive masquerading measures opens the door to potentially devastating attacks. Such attacks are typically fairly easy for the first and last nodes on a given routing chain to carry out just by communicating and correlating (and possibly altering) the traffic that passes through them.

The second approach proposed for hiding the client-server association is based on the "crowds-style" anonymity scheme. Under this approach, browsers on client machines can "join the crowds" and become candidates for routing traffic from and to other browsers. In other words, the client browser not only sends its own requests to a target Web host but also routes Web requests and responses for other clients. The efficacy of privacy protection provided by this scheme relies on the large number of browser routers in the "crowd." The main source of security lies in the fact that any browser on the forwarding chain could be the initiator of the forwarded request. Thus, the real client that sends the requests to the target server has "plausible deniability," in the sense that it can assert the requests were initiated by another client machine, and it is just forwarding those requests.

A significant drawback of the "crowds-style" approach is that there cannot be a firewall between browser routers.

This limitation can severely compromise the security of the client systems participating in the scheme. Moreover, each browser on the chain needs to see the plaintext request in case it decides to forward it directly. As a result, every browser in the chain knows the target server. The first browser, which is connected directly to the client and sees both ends of the chain clearly, may then be able to deduce from the timing, context, or external information of the messages that it is indeed the first node on the chain, thereby discovering the client-server association.

In view of the foregoing, what is needed is a new and improved privacy/anonymity protection scheme for communications over the Internet (or similar large networks) that has the general advantages of the "mix-style" and "crowds-style" approaches discussed above but avoids the drawbacks associated with those approaches.

SUMMARY OF THE INVENTION

In view of the foregoing, the present invention provides a new scheme for protecting the privacy and anonymity of a client when it communicates with a target server over the Internet. In accordance with a feature of the invention, a plurality of Web servers are randomly selected from a pool of participating Web servers for use as routers in a routing chain for routing messages between the client and a target server. To prevent traffic analysis, the "onion encryption" scheme is applied to the messages along the routing chain. When the client intends to communicate with the target server, it sends a request for a secured routing chain to a trusted routing control server. The routing control server then selects Web servers for creating the routing chain, generates a first set of cryptographic keys for the respective Web servers, and deposits the cryptographic keys with the respective Web servers. The routing control server also sends routing information identifying the Web servers in the chain and a second set of cryptographic keys that correspond to the respective keys in the first set to the client.

Messages passed between the client and the target server are then routed through the chain of Web servers, which carry out the onion encryption scheme using their respective cryptographic keys. Specifically, the client encrypts a message to be sent to the target server with each of the cryptographic keys in the second set of keys it received from the routing control server. The encrypted message is then sent through the chain of Web servers. When a Web server in the chain receives the message, it decrypts the message using its cryptographic key and then forwards the decrypted message to the next downstream node on the chain.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
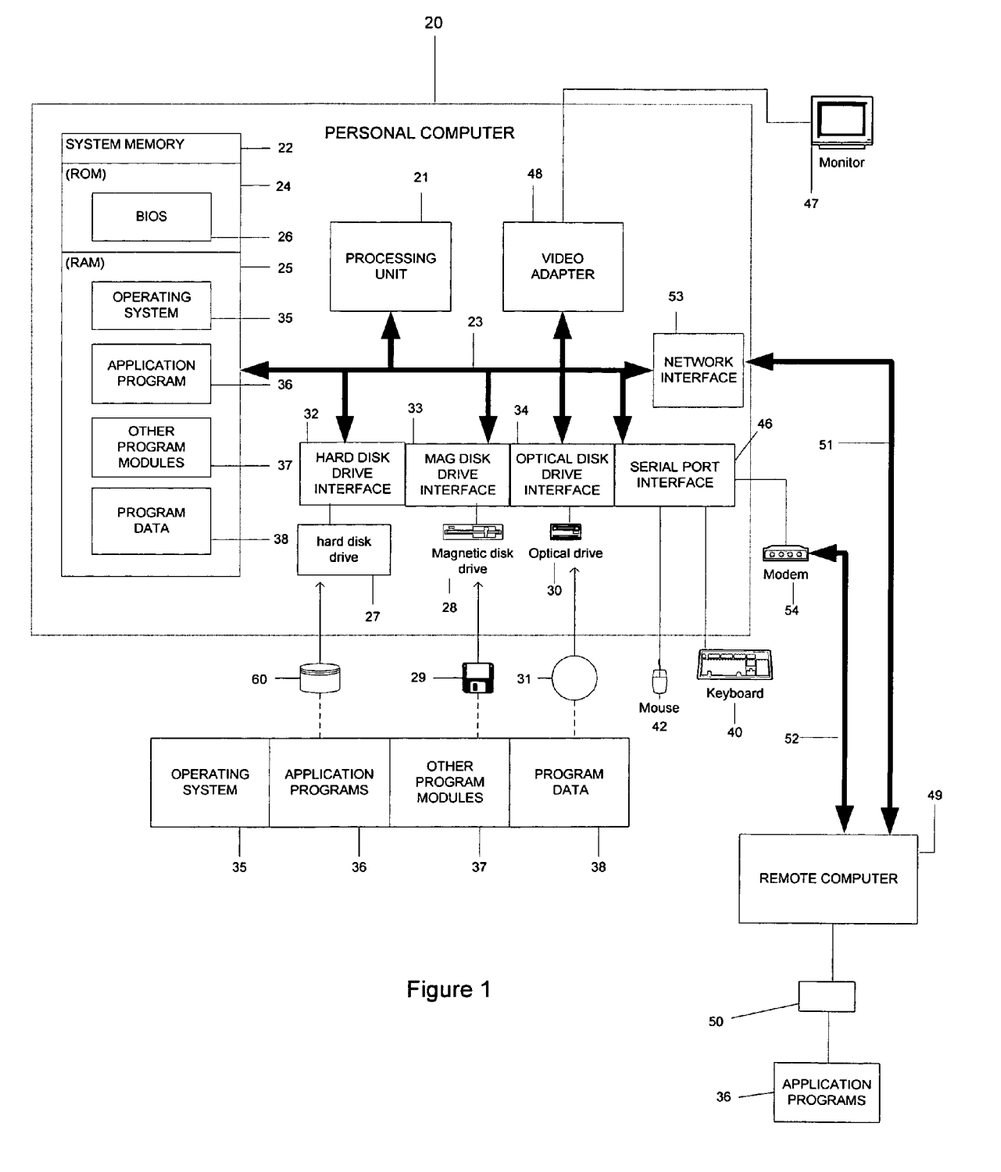
FIG. 1 is a block diagram generally illustrating an exemplary computer that may be used for implementing components of a system according to the present invention for protecting privacy and anonymity of parties involved in network communications.

The following description begins with a description of a general-purpose computing device that may be used in an exemplary system for implementing the invention, and the invention will be described in greater detail with reference to FIGS. 2 and 3. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25.

A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and, inter alia, the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
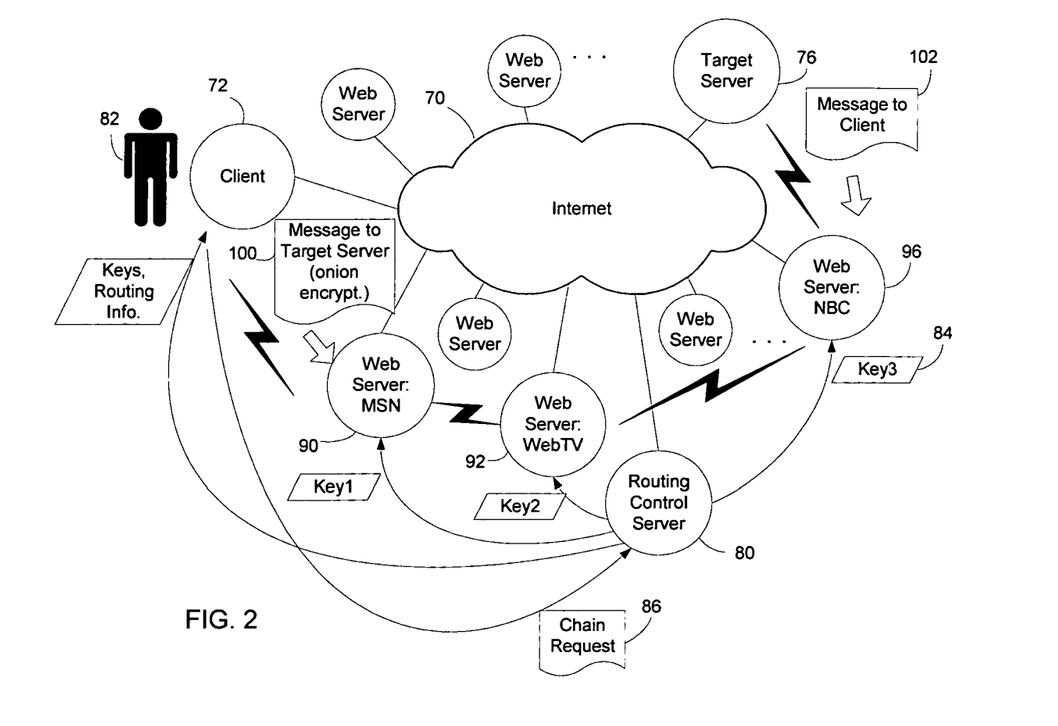
FIG. 2 is a schematic diagram showing a client communicating with a target server through a chain of a Web servers functioning as routers according to the privacy protection scheme of the invention.

Referring now to FIG. 2, the present invention is directed to a scheme for protecting the privacy and anonymity of parties that send network communications over the Internet 70 or a similar large network, where the messages are typically routed by multiple intermediate nodes. A general assumption is that each of those intermediate nodes may not be trustworthy, and some intermediate nodes may collude to eavesdrop on the communications or perform traffic analyses to seek out the identities of the communicating parties. The protection scheme of the invention allows a client 72 to communicate with a target server 76 in a way that prevents others from discovering the client-server association when the messages are routed over the network. Moreover, the client can remain anonymous even with respect to the target server.

In accordance with a feature of the invention, effective protection of the privacy and anonymity of the communicating parties is achieved by using a plurality of Web servers in a routing chain for routing messages passed between the client 72 and the target server 76, and using an "onion encryption" scheme along the routing chain to make the messages difficult to track. For purposes of describing the present invention, the term "Web server" is intended to mean broadly any server that can respond to HTTP requests. They can accept HTTP requests from end-user browsers and respond with Web pages, or accept requests from other Web servers and reply with requested information or just return the request processing status, which is not in the form of Web pages.

A central component of the privacy protection scheme is a routing control server 80 that functions as a "trusted entity" for setting up, upon the request of the client, a chain of Web servers for routing messages. When a user 82 wants to communicate with the target server 76, she uses the client machine 72 to send a request 86 to the routing control server 80 for a secured routing chain that will be used for routing communication messages between the client and the target server 76.

In response to the request from the client 72, the routing control server 80 randomly selects a number of Web servers from a pool of available Web servers that participate in the protection scheme for providing routing service. The selected Web servers are to be used as routers for the network communication traffic between the client and the target server 76 (or any Web host the client wants to access). In the example shown in FIG. 2, the Web servers 90, 92 and 96 are selected by the routing control server 80 to form a routing chain between the client 72 and the target server 76. Generally, how many Web servers should be used in the routing chain would depend on the number of potential colluders that the system can tolerate without compromising the anonymity. It will be appreciated that for simplicity of illustration only three Web servers are shown in this example. In an actual deployment the number of Web servers in the chain may be greater or smaller. Also, the number of Web servers in a chain may be fixed or dynamically adjusted, depending on the particular implementation.

For the selected Web servers, the routing control server 80 generates a plurality of cryptographic keys 84, one for each of the selected Web servers. The routing control server then deposits each cryptographic key with the corresponding Web server for use in the session. As part of the key depositing operation, the routing control server 80 tells each Web server in the chain that if it receives a forwarding request from a particular IP address (the IP address of previous hop in the routing chain) with a particular message ID, then it should use the key deposited with it to decrypt the request to peel away a layer of the encryption onion. Peeling the layer of the encryption onion will reveal the IP address of the next hop and the message ID that the Web server should use for forwarding the request message to the next hop.

The routing control server 80 also gives the client 72 a set of cryptographic keys that correspond to the keys given to the Web servers. The keys given to the client may or may not be identical to those given to the Web servers, depending on the encryption scheme used. In a preferred embodiment, each Web server in the routing chain and the client share an encryption key to be used for the session. In an alternative embodiment, a "public-private" key pair is generated for each Web server in the routing chain. The private key is given to the Web server, and the corresponding public key is given to the client 72. Regardless of which encryption scheme is used, the client 72 has a set of cryptographic keys that correspond to the set of cryptographic keys given to the respective Web servers in the routing chain. In addition to the cryptographic keys, the routing control server 80 also sends to the client 72 routing information regarding the Web servers in the chain.

The information identifies the Web servers, their IP addresses, and their order in the chain.

After the routing chain is set up, communication packets passed between the client and the target server are routed through the Web servers in the chain, and the "onion encryption" scheme is carried out along the chain using the cryptographic keys given to the client and the Web servers.

Specifically, when the client 72 wants to send a message to the target server 76, it encrypts the message multiple times using each of the encryption keys corresponding to those of the Web servers, and the layering of the encryption is in the order of the Web servers in the chain. Thus, in the example of FIG. 2, the message is encrypted first with the key associated with the Web server 96, which is closest to the target server 76, and then with the key associated with the Web server 92, and lastly with the key associated with the Web server 90.

The encrypted message 100 is then forwarded to the first Web server in the chain, namely the Web server 90. The Web server 90 uses its key to decrypt the received message, thereby stripping one layer of the encryption, and sends the message to the next Web server (the Web server 92) in the chain, and so on. By the time the target server 76 receives the message, all the layers of encryption by the client with the keys associated with the Web server have been removed.

In the reverse direction, layers of encryption are added onto a message sent by the target server 76 to the client 72. In the given example, the target server 76 sends a response message 102 to the Web server in the chain closest to it, namely the Web server 96. The Web server 96 encrypts the message with its encryption key, and forwards the encrypted message to the Web server 92. The Web server 92 then encrypts the message with its encryption key, and forwards it to the Web server 90, which in turn encrypts the message with its encryption key, and forwards the message to the client 72. The client 72 then uses the encryption keys associated with the Web servers to decrypt the message, thereby removing all the layers of encryption. In this way, each Web server in the chain removes or applies encryption as the messages flow to and from the target server through the chain.

In contrast to the conventional "mix-style" approach, the privacy/anonymity protection scheme of the invention uses Web servers selected from a large pool of participating Web server for routing requests from various clients, instead of using a fixed set of dedicated routers ("mixes") to route the requests. The server selection may be random or semi-random taking into account, for example, the server loads as a factor. Thus, Web servers, which may themselves become a target server for some clients on the network, become the routers for routing Web requests and responses. An advantage of this arrangement inherent to the dual roles of the Web servers is that the client has "plausible deniability," in the sense that the user can claim that she is only accessing the first Web server in the chain. Also, the scheme provides "security-in-number," because the routed message is mingled with regular Web access responses sent out by each routing server in the chain, and the large number of requests regularly served by each Web server can make traffic analysis very difficult. In this regard, in contrast to the prior art, there is no need to intentionally add cover traffic and delays, because the significant traffic volume generated by normal Web processing will effectively mask the traffic.

Another potential advantage is that a large number of Web servers can be participate in the privacy protection scheme, and the Web servers to be used in the routing chain for a client can be randomly selected from the pool of participating Web servers. This makes the routing chain difficult to predict or trace. The large number of available Web servers for routing also allows traffic loads to be distributed over many Web servers, in contrast to the need to use a fixed set of dedicated routers in the conventional "mix-style" network.

In accordance with another aspect of the invention, the scheme of the invention not only provides privacy and anonymity of the client 72 in terms of hiding the client-host association, but also allows the client to remain anonymous with respect to the target server 76. To access the target server 76, the client 72 does not have to provide its own IP address or the user credentials to the target server. Instead, in each encryption layer of the message to be sent to the target server, the client 72 includes the IP address of the node that is the next hop in the routing chain. That next node may be another Web server or the target server. For example, in the routing chain shown in FIG. 2, when the Web server 90 receives the message, it decrypts the message using its session key and finds the IP address for the next hop (the Web server 92) and also the message ID to be used for forwarding the message. The Web server 90 then forwards the message to that address. When the target server 76 receives the request message from the Web server 96, it treats that Web server as the request initiator and sends the response message to that Web server.

The Web server 96 then encrypts the response message with its key and forwards the encrypted response to the Web server 92 from whom it received the associated request message.

In this way, the scheme allows a client to access a target server without revealing its identify to the target server. It will be appreciated that in this context the client need not be considered as the computer of an individual Internet user. Instead, the client may be, for instance, a publisher of Web-based events that wants to send information to the target server that is a subscriber of the events. In that case, the scheme of the invention can be used to effectively mask the identity of the source of the published events from the subscribers.

Figure 3:
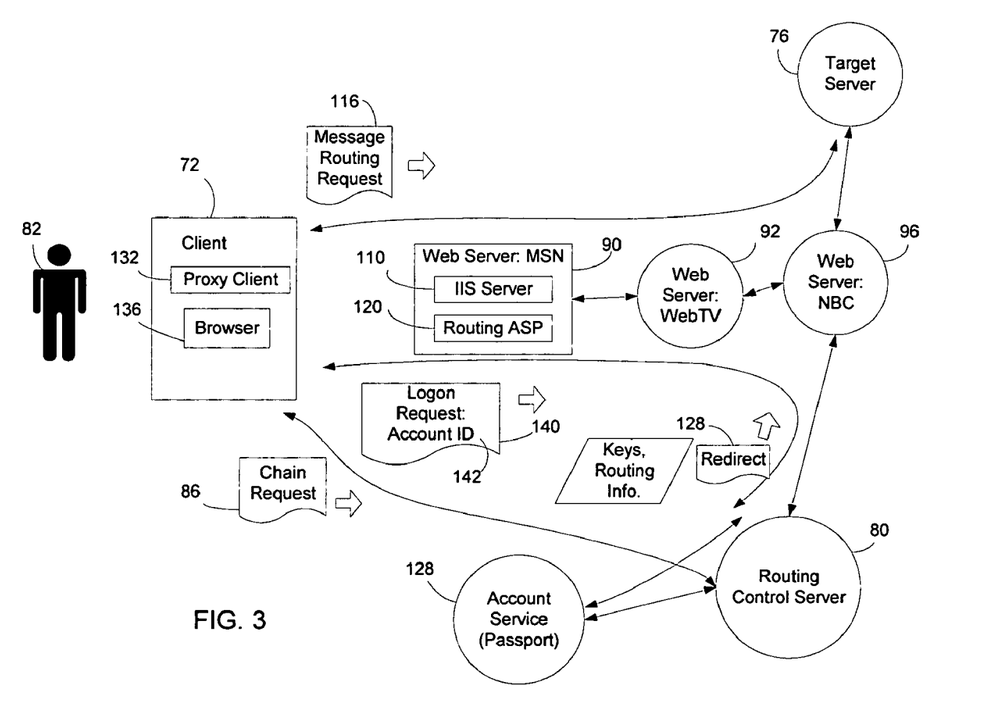
FIG. 3 is a schematic diagram showing an embodiment of a system according to the present invention for protecting network communication privacy and anonymity.

In an embodiment shown in FIG. 3, each of the Web servers 90, 92, and 96 participating in the routing scheme runs the "Microsoft Internet Information Server" (IIS) software 110. Each Web server also has a routing module 120 installed therein running under the IIS for handling the work of an intermediate node in the chain established by the routing control server for routing messages. The routing module 120 is an IIS-hosted Active Server Page (ASP) program. It accepts all incoming HTTP requests generated by clients using the privacy protection service. For each incoming request 116, the routing module 120 decrypts the request with the proper encryption key to remove one encryption layer from the request, and forwards the request to the next node in the routing chain, which may be another Web server or the target server. In the opposite direction of traffic flow, the routing module 120 accepts returning HTTP responses generated by the preceding node (another Web server in the routing chain or the target server), encrypting each response with the proper encryption key, and sends the encrypted response to the next node in the direction of the client, which may be another Web server or the client.

Any routing request 116 to a Web server (e.g., the Web server 90) in the routing chain is encoded using the Simple Object Access Protocol (SOAP) as the messaging protocol and sent to the routing module 120. The target ASP page is revealed to the Web server after the outer onion layer is peeled, and the Web server will process the message accordingly. Similar to how a Web server knows which Web page a client is requesting, the HTTP request 116 includes a predefined URL or some other identifier to indicate that it is a routing request. By way of example, if the target ASP is "MasqueradeRoute.asp", then the Web server knows it is a routing request, and its ASP service will forward the message to the next hop in the routing chain. Thus, the routing message is formatted and handled in the same way or much like any other regular Website access requests. This arrangement allows the privacy protection system to take advantage of the scalable design of the Web servers and simplify the deployment of the routers, thereby allowing a large number of router candidates to be used to provide "security-in-numbers."

On the client side, the client 72 includes an HTTP proxy client component 132 that is a standalone executable that acts like a local proxy server. This proxy client component 132 is responsible for performing the client-side operations required by the privacy protection scheme. To enable the proxy client component to work on both outgoing and incoming messages, the proxy setting for the browser 136 on the client 72 is set to point to the local host (i.e., the client's machine). In this way, the proxy client component is able to intercept both browser-based messages as well as other types of HTTP messages, such as MSN Instant Messenger messages, and starts the chain from the client's machine to perform the processing and routing required by the privacy protection scheme.

In a real-world deployment of the privacy protection system, as in many cases of providing services on the Internet, it may be desirable to have the user pay for the service rendered. The issue is how to enable the user to make payments in conjunction with using the privacy protection service without compromising the privacy and anonymity of the user. In one embodiment as illustrated in FIG. 3, an account service 128 separate from the routing control server 80 is provided for handling user authentication and payment processing in cooperation with the routing control service 80. The account service 128 may be, for instance, a "Microsoft NET Passport" server. The operation of the account service is described in greater detail below.

When the user 82 selects to use the privacy protection service for communications with a target server 76, the proxy client component 132 makes a request for a routing chain to the routing control server 80 to acquire all the encryption keys and routing information for the routing chain. In response, the routing control server 80 generates encryption keys to be used to form the multi-layered encryption (i.e., the "encryption onion"), and selects Web servers from the pool of available Web servers that can be used to form a reasonable routing chain for this user's session. The routing control server 80 then negotiates with each of the selected Web servers for the session, and deposits a corresponding cryptographic key with that Web server if the negotiation is successful. The routing control server 80 then communicates with the proxy client component 132 of the client to provide cryptographic keys associated with those deposited with the selected Web servers and the routing information for the routing chain.

Upon a successful chain negotiation with the routing control server 80, the proxy client component 132 sends a logon request 140 to the routing control server 80. The logon request 140, and subsequent communications between the client 72 and the routing control server 80 or the service, are all sent through the routing chain with onion encryption using the session keys as described above. This allows the client to provide logon and payment information to the routing control server or the account service in a secure and protected manner. The logon request 140 includes an account ID 142 provided by the user, and may include other user credentials, if needed for authentication of the user.

Instead of processing the logon request by itself, the routing control server 80 sends a "redirect" response 146 telling the client to send the logon request to the account service 128. In response, the client resends the logon request to the account service 128 through the chain of routing Web servers.

Using the account ID 142 and other user credentials (if included) in the logon request 140, the account service 128 authenticates the user, including checking whether the account ID is valid. The account service 128 then informs the routing control server 80 whether the logon is successful. If the logon is successful, the account service updates the timeouts for the routing chain and notifies the client 72 of the successful logon. On the other hand, if the user authentication by the account service has failed, the routing control server 80 tears down the routing chain and tells the client that the logon has failed.

After a successful logon, the client 72 can send its messages to any target server on the network through the established routing chain. Specifically, all the HTTP POST and GET request messages are encapsulated by the proxy client component 132 in an encryption onion using the cryptographic keys given by the routing control server for the session, and forwarded to the first Web server 90 in the routing chain. When the user turns the privacy protection off, the proxy client component performs a sign-out operation with the account service, discontinues the interception of HTTP requests, and destroys the cryptographic keys for the session.

In one implementation, to use the privacy protection service, the user is required to have a pre-existing valid account (such as a "Passport wallet") recognized by the account service. When the user 82 sends a logon request 142 to the account service 128, the account service authenticates the user using the account ID and password provided by the user, without revealing to the routing control server 80 the user's account ID, which could be used to find out the true identity of the user. The account service can then charge the user's account (e.g., by billing to the credit card number supplied by the user for that account) for the privacy protection service rendered.

In accordance with an aspect of the embodiment, the user does not have to provide any ID or credentials that will reveal her true identity. Instead, the user can logon with a pseudonym as the account ID that is linked to an account to which the service can be charged. Pseudonyms are typically used to allow users to have a long-term relationship with services without revealing their true identities. In this regard, the system provides "pseudonym anonymity" in that the system prevents others from linking a pseudonym to the true identity of the user by, for example, observing both traffics coming out of the same IP address. The charge account may be an anonymous one. As an example, an anonymous account may be a pre-paid phone card. The use of a pseudonym protects the real identity of the user while providing some accountability for the user, especially in connection with payments for the privacy protection service.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for a Web server, the method comprising:
   receiving a cryptographic key from a routing control server for use in
   routing messages passed during a communication session between a client and a target server;
   receiving a message associated with the communication session from an upstream node of a routing chain for the communication session in which the Web server is a node;

decrypting the message from the upstream Web server with the cryptographic key; and forwarding the decrypted message to a downstream node of the routing chain.

2. The method of claim 1 further comprising:

receiving a message associated with the communication session from the downstream node;

encrypting the message received from the downstream node with the cryptographic key; and forwarding the encrypted message to the upstream node.

3. A computer-readable medium having stored thereon a secure message data structure, the secure message data structure comprising:

a first data field containing data representing an ordered chain of Web servers, the ordered chain comprising identifications of a plurality of Web servers;

a second data field containing data representing a plurality of cryptographic keys;

a third data field containing data representing a message; and a fourth data field containing data representing an encrypted version of the message, the encrypted message formed by encrypting the message with the plurality of cryptographic keys according to an order of the Web servers in the ordered chain of Web servers.

4. A system for protecting a message sent from a client over the Internet to a target server, the system comprising:

the message;

the client configured for sending a request to a routing control server for a secure routing chain of Web servers, for receiving from the routing control server routing information identifying a plurality of Web servers in the secure routing chain, for receiving from the routing control server a plurality of cryptographic keys each corresponding to a Web server in the secure routing chain, for formatting the message according to a protocol for accessing Web services, for encrypting the message with the plurality of cryptographic keys according to an order of the Web servers in the secure routing chain, and for forwarding the encrypted message to a first Web server in the secure routing chain; and the routing control server.

5. The system of claim 4 wherein the client is further configured for receiving a message from the target server, and for decrypting the received message with the plurality of cryptographic keys according to the order of the Web servers in the secure routing chain.

6. The system of claim 4 wherein the client is further configured for sending to an account service an authentication request containing a user account ID for payment for service.

7. The system of claim 6 wherein the account ID is an anonymous account ID.

8. The system of claim 6 wherein the authentication request is sent to the account service through the secure routing chain of Web servers.

9. A system for securely transmitting a message sent from a client over the Internet to a target server, the system comprising:

a Web server configured for receiving a cryptographic key from a routing control server for use in routing the message, for receiving an encrypted version of the message from an upstream node of a secure routing chain, for decrypting the message received from the upstream node with the cryptographic key, and for forwarding the decrypted message to a downstream node of the secure routing chain; and the routing control server.

10. The system of claim 9 wherein the Web server is further configured for receiving a message from the downstream node, for encrypting the message received from the downstream node with the cryptographic key, and for forwarding the encrypted message to the upstream node.

* * * * *